INVENTOR.
LEON C. MILLER
BY Herbert E. Kidder
AGENT

3,216,538
JOINT FOR SECURING METAL AWNING PANELS TOGETHER

Leon C. Miller, Bridgeport, Conn., assignor, by mesne assignments, to Alcan Aluminum Corporation, New York, N.Y., a corporation of New York
Filed Oct. 2, 1961, Ser. No. 142,397
1 Claim. (Cl. 189—36)

This invention relates to metal awnings, and more particularly to a splice member for interconnecting the abutting ends of a pair of awning panels.

In assembling metal awnings, practical considerations of handling and working with the sheet metal awning panels limit the length of such panels which are joined together to form the awning canopy. Thus, on larger size awnings, it becomes necessary to join panels together end-to-end in order to provide long, uninterrupted lengths of awning canopy. Heretofore, the customary method of joining awning panels together has been to splice them or attach the abutting ends to a structural member, using sheet metal screws, or similar fasteners. Such fasteners are not only unsightly and detract from the appearance of the awning, but they are also time-consuming and expensive to install, and require the use of special tools which are sometimes awkward to handle while assembling the awning.

The present invention has been developed to overcome these and other disadvantages and shortcomings of the prior art devices and provide a panel splicer that is simple to construct, easy to install, and inexpensive to manufacture. The device of this invention comprises an extruded double channel member having formations provided therein to receive the abutting end portions of a pair of awning panels in a positive interlocking connection. The installation of the splicer does not require the use of any tools other than a simple device for forming channel-engaging tabs adjacent the ends of the panels.

The primary object of the present invention is to provide a new and improved splicer for interconnecting the adjoining ends of a pair of aligned sheet metal awning panel members.

Another object of the invention is to provide a novel splicer for aligned panel members, that is simple to manufacture and easy to install without requiring special tools or fasteners, such as screws or rivets.

The foregoing and other objects and advantages of the present invention will become apparent to those skilled in the art upon consideration of the following detailed description of the preferred embodiment thereof, reference being had to the accompanying drawings, wherein.

Figure 1:
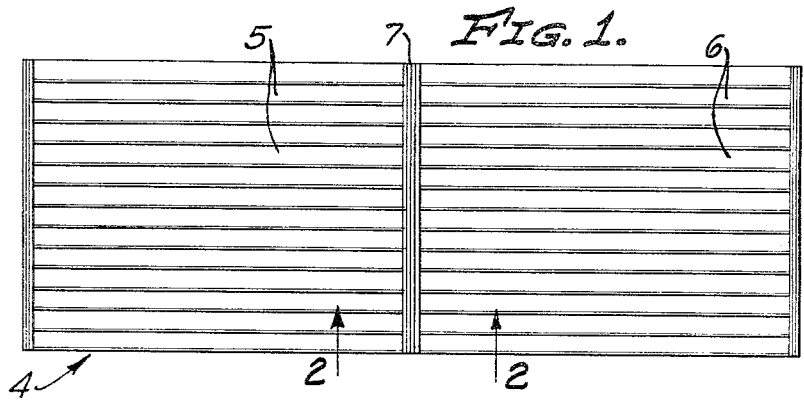
FIGURE 1 is a top or plan view of an awning canopy made up of two sections of sheet metal panels, which are connected together by the splicer of the present invention.
Figure 2:
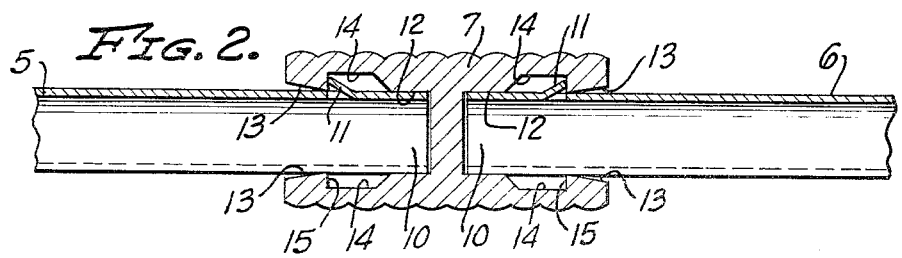
FIGURE 2 is an enlarged sectional view taken along line 2—2 of FIGURE 1.
Figure 3:
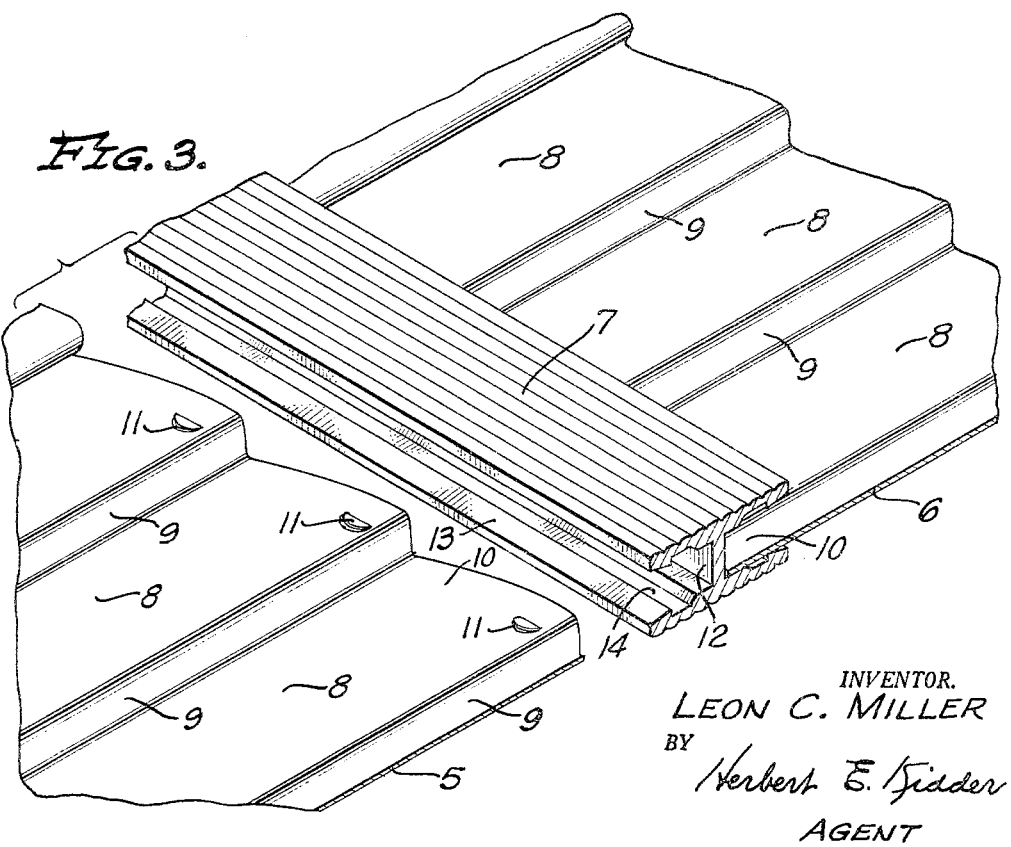
FIGURE 3 is a perspective view illustrating the construction and manner of assembling the splicer and associated panel members of FIGURES 1 and 2.

Referring now to FIGURES 1 and 2, these views show an awning canopy 4 made up of two sections of sheet metal panels 5 and 6, which are interconnected by a splicer 7 embodying the principles of the present invention. Panels 5 and 6 are preferably of sheet aluminum, and may be of any cross-sectional configuration, the preferred form being the step-down configuration shown in the drawings, comprising a plurality of flat, generally horizontal portions 8 and intervening vertical wall portions 9. This formation provides maximum strength and resistance to flexure, and has a pleasing appearance. Panel members 5 and 6 have adjoining end portions 10, and a plurality of semi-circular tabs 11 are lanced upwardly from the flat portions 8 of the panels adjacent the wall portions 9.

Splicer 7 is preferably an elongated extrusion of aluminum alloy, having a symmetrical, generally H-shaped cross-section, defining a pair of oppositely facing channels 12 for receiving the adjacent or abutting ends 10 of panels 5 and 6. Each of the channels 12 is of substantially the same width as the overall height of the panels 5 and 6 so that the ends 10 of the panels fit snugly within and frictionally engage the channels, as shown in FIGURE 2.

The outer openings 13 of the channels 12 are preferably flared, as best seen in FIGURE 2, to facilitate inserting the ends 10 of the panels 5 and 6 into the channels 12. Formed in the top and bottom inner surfaces of each of the channels 12 are two longitudinally extending grooves 14, each of which has an inwardly facing vertical shoulder 15, into which the tabs 11 snap when the ends 10 of the panels 5 and 6 are inserted all the way into the channels 12. The free ends of the tabs 11 face away from the adjacent ends of the panels, and abut against the shoulder 15 to prevent withdrawal of the panel from the channel 12. There is thus effected a self-locking interengagement of the panels 5 and 6 in the channels 12 of the splice member 7.

Tabs 11 are illustrated as being lanced upwardly from the surface of the panels, and have sufficient resilient flexibility to bend down slightly and permit entrance of ends 10 into the channels, and thereafter spring into grooves 14. There is thus provided by this invention a strong and secure splice for sheet metal awning panel members, permitting the assembly of awnings and patio roof structures of any desired length without using screws, rivets, or other fastening means to attach the panel together, end-to-end. Moreover the invention speeds up and facilitates the assembly of such awnings and patio structures, inasmuch as all that is required to join the panel members 5 and 6 together is to push their ends 10 into the channels 12 of the splice member 7.

While I have shown and described in considerable detail what I believe to be the preferred form of my invention, it will be understood by those skilled in the art that various changes may be made in the shape and arrangement of the parts without departing from the broad scope of the invention, as defined in the following claim.

I claim:

A joint for joining together sheet metal awning panels which are arranged end-to-end, each of said awning panels including a plurality of flat, generally horizontal portions and intervening vertical wall portions, each of said horizontal portions having an integral resilient locking tab lanced upwardly from one surface thereof closely adjacent the end to be joined, each of said locking tabs being located closely adjacent to the upper edge of the intervening vertical wall portion, said locking tabs being upwardly and angularly inclined with respect to the surface of said panel and having the free ends thereof facing away from the adjacent end of said panel, a rigid splicer of substantially H-shaped symmetrical configuration having oppositely facing channels formed in the sides thereof, said channels being provided with parallel top and bottom inner surfaces spaced apart substantially the same distance as the overall height of the vertical walls of said panels whereby the ends of said panels fit snugly within said channels and frictionally engage said top and bottom inner surfaces, and each of said channels being provided with a longitudinal groove extending along the top and bottom inner surfaces thereof, said grooves being located substantially centrally of said top and bottom inner surfaces and each of said grooves including a vertically disposed shoulder spaced from the free edge of said top and bottom inner surfaces and against which the free ends of said locking tabs abut when the end of the panel has been inserted all the way into the channel so as to lock said panel within said splicer and prevent lateral withdrawal of the panel therefrom, the openings of said channels being flared outwardly from said longitudinal grooves to facilitate insertion of the panel ends and upwardly inclined tabs into the channels.

References Cited by the Examiner

UNITED STATES PATENTS

| | | | |
|---|---|---|---|
| 1,297,591 | 3/19 | Prescott | 189—36 |
| 2,101,952 | 12/37 | Olsen | 189—85 X |
| 2,189,159 | 2/40 | Anschicks | 189—36 |
| 2,785,445 | 3/57 | Phillips | 20—57.5 |
| 2,900,681 | 8/59 | Becker | 20—57.5 |

FOREIGN PATENTS 156,534   5/54   Australia.

RICHARD W. COOKE, Jr., *Primary Examiner.*
JOEL REZNEK, *Examiner.*